United States Patent [19]
Freed

[11] Patent Number: 5,326,192
[45] Date of Patent: Jul. 5, 1994

[54] METHODS FOR IMPROVING APPEARANCE AND PERFORMANCE CHARACTERISTICS OF TURF SURFACES

[75] Inventor: W. Wayne Freed, Signal Mountain, Tenn.

[73] Assignee: Synthetic Industries, Inc., Chickamauga, Ga.

[21] Appl. No.: 964,209

[22] Filed: Oct. 20, 1992

[51] Int. Cl.$^5$ .................. E02D 3/12; C09K 17/00
[52] U.S. Cl. ............................ 405/258; 47/9; 47/56; 47/1.01; 405/263
[58] Field of Search .......... 405/263, 258, 264, 24; 47/1 F, 9, 59, 56

[56] References Cited

U.S. PATENT DOCUMENTS

| | | |
|---|---|---|
| 2,632,979 | 3/1953 | Alexander ............... 47/9 X |
| 3,091,436 | 5/1963 | Finn . |
| 3,125,294 | 3/1964 | Lill . |
| 3,334,556 | 10/1965 | Owen . |
| 3,591,395 | 7/1971 | Zonsveld et al. . |
| 3,645,961 | 12/1972 | Goldrein . |
| 3,797,690 | 3/1974 | Taylor et al. . |
| 3,863,388 | 2/1975 | Loads ..................... 47/56 |
| 3,934,421 | 1/1976 | Daimler et al. . |
| 3,971,223 | 7/1976 | Barrett . |
| 3,995,079 | 11/1976 | Haas, Jr. . |
| 4,002,034 | 1/1977 | Mühring et al. . |
| 4,015,994 | 4/1977 | Hill . |
| 4,023,506 | 5/1977 | Robey .................... 47/1 F |
| 4,044,179 | 8/1977 | Haas, Jr. . |
| 4,199,366 | 4/1980 | Schafer et al. . |
| 4,261,725 | 4/1981 | Schmidt . |
| 4,272,294 | 6/1981 | Javnarajs . |
| 4,329,392 | 5/1982 | Bronner . |
| 4,369,054 | 1/1983 | Shinholster, Jr. et al. . |
| 4,389,435 | 6/1983 | Haas, Jr. . |
| 4,396,653 | 8/1983 | Tomarin . |
| 4,403,891 | 7/1983 | Ohaka et al. . |
| 4,421,439 | 12/1983 | ter Burg et al. . |
| 4,472,086 | 9/1984 | Leach . |
| 4,497,853 | 2/1985 | Tomarin . |
| 4,565,840 | 1/1986 | Kobayashi et al. . |
| 4,637,942 | 1/1987 | Tomarin . |
| 4,662,946 | 5/1987 | Mercer . |
| 4,762,581 | 8/1988 | Stancliffe et al. . |
| 4,790,691 | 12/1988 | Freed . |
| 4,819,933 | 4/1989 | Armond . |
| 4,867,614 | 7/1989 | Freed . |
| 4,900,010 | 2/1990 | Wengmann et al. ........ 47/1 F |
| 4,916,855 | 4/1990 | Halliday et al. ........... 47/9 X |
| 5,014,462 | 5/1991 | Malmgren et al. ......... 47/1 F |

FOREIGN PATENT DOCUMENTS

| | | |
|---|---|---|
| 2004754 | 5/1983 | Fed. Rep. of Germany . |
| 3627507 | 2/1988 | Fed. Rep. of Germany ........ 47/9 |
| 2442809 | 6/1980 | France . |
| 124582 | 9/1980 | Japan . |
| 40193 | 8/1982 | Japan . |
| 2184765 | 10/1989 | United Kingdom . |

Primary Examiner—Dennis L. Taylor
Attorney, Agent, or Firm—Renner, Kenner, Greive, Bobak, Taylor & Weber

[57] ABSTRACT

A method for the improvement of appearance and performance characteristics of turf surfaces includes the steps of applying from about 0.1 to about 0.5 percent by weight of discrete fiber materials (14) selected from the group consisting of man-made fiber forming substances to turf growing and turf containing areas (10) and then working the discrete fiber materials into the areas. Working may allow a first portion of the fiber materials to be carried beneath the surface (11) of the area so as to promote reinforcement and anchoring of the turf (12) at the root zone level and a second portion to be at least partially exposed above the surface of the area, so as to remain visible with the turf. A related method for the improvement of appearance and performance characteristics of turf surfaces is also provided for turf propagated in previously barren surfaces.

18 Claims, 1 Drawing Sheet

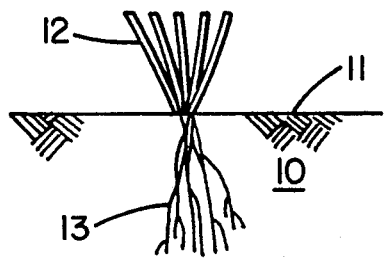
FIG. 1A
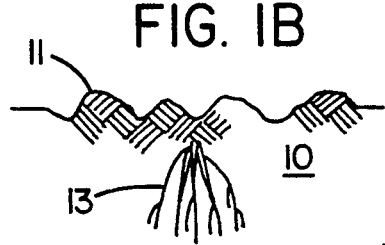
FIG. 1B
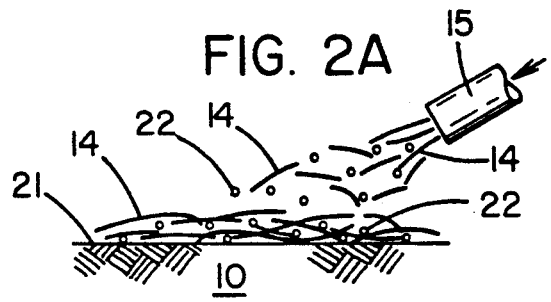
FIG. 2A
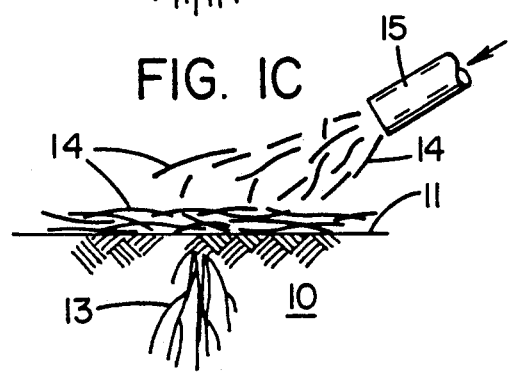
FIG. 1C
FIG. 1D
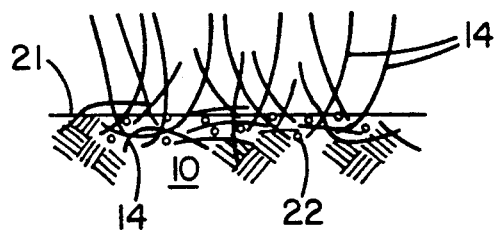
FIG. 2B
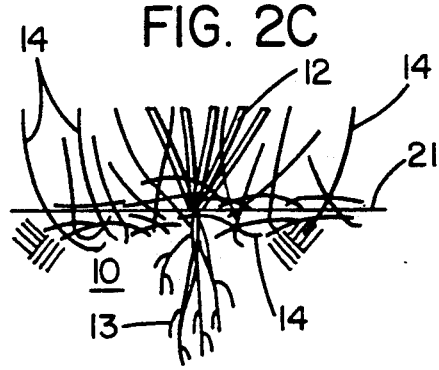
FIG. 2C
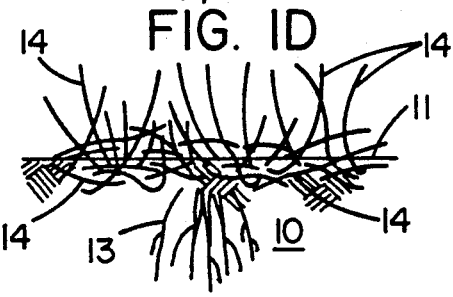
FIG. 1E
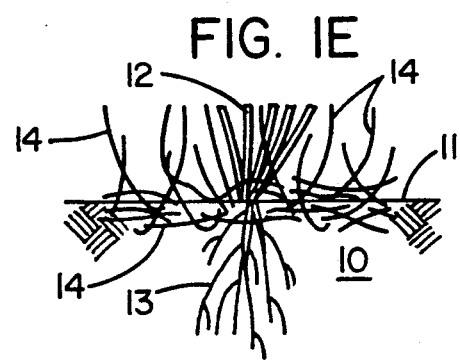

METHODS FOR IMPROVING APPEARANCE AND PERFORMANCE CHARACTERISTICS OF TURF SURFACES

TECHNICAL FIELD

The present invention relates to turf surfaces including lawnscapes and turfed surfaces for sporting events such as football, baseball, soccer, and polo fields, golf courses and the like. Methods are provided which involve the application of fibers to either the bare (non-grassed) areas or grassy areas. The fibers are then worked into the soil or turf. The treated area also gains improved performance characteristics and the worked in fibers aid and protect the development of new as well as existing grass roots which, in turn, further facilitates the improvements. One result is that the appearance of the area is improved, particularly when colored fibers are employed.

BACKGROUND ART

In general, a variety of materials have been blended with soils to enhance or improve the properties thereof. In early highway construction, soil and rocks were mixed to provide a more stable, free draining, better performing roadbed. Lime has routinely been added to clay and silty soils to reduce their plasticities and to reduce their swelling potential. Portland cement has been added to several types of soils, being mixed in place or in a batch plant for achieving an improved highway base material. More recently, woven synthetic materials have been places in horizontal layers of soil in order to achieve steep, stable earth slopes.

Examples of the last technique, involving the use of so-called geotextiles, have been described in the patent literature. U.S. Pat. No. 3,934,421, for instance, is directed toward a matting of continuous thermoplastic filaments that are bonded together at intersections. When placed in loose soil, the matting provides increased vertical load bearing capacity and resistance to lateral deformation.

U.S. Pat. No. 4,002,034 also discloses a matting, anchored to the ground, for preventing erosion. The matting is a multi-layered composite providing an uppermost layer having the finest fibers and least pore spaces and a ground side layer having the thickest fibers and greatest pore spaces.

U.S. Pat. No. 4,329,392 provides a layered matting designed to inhibit rearrangement of soil particles. The matting comprises self-spun synthetic polymer filaments with macrofibers forming a web, a filter layer of finer fibers bonded thereto and an intermediate layer of other fibers therebetween. The mat has use below water level to control erosion.

U.S. Pat. No. 4,421,439 is directed toward woven fabric, comprising filaments such as polyester, polyamides and polyolefins. The fabric is positioned beneath sand, gravel, stones, clay, loam and the like at a depth of at least 10 cm. The invention is based on the particular construction of the fabric which gives it improved load bearing performance.

Another unique configuration geotextile material is disclosed in U.S. Pat. No. 4,472,086. The material is used as a reinforcement for the construction of roadways and on slopes and river banks to control erosion.

Despite the wide-spread use of man-made or synthetic filaments in fabrics, matting and the like as a reinforcement for soil, the foregoing patents have not taught the use of individual fiber blended with the soil.

U.S. Pat. Nos. 4,790,691 and 4,867,614, however, do teach the addition of individual fibers or bundles or discrete synthetic textile materials, as opposed to textile fabrics, which are blended with all forms of soil to improve the engineering properties of the soil. Practice of these patents facilitates construction at roadways, highways, building sites, parking areas and the like by stabilizing the soil and improving the load bearing capabilities thereof.

U.S. Pat. No. 4,819,933, similarly discloses the use of a mixture comprising sand and individual strands of synthetic fibers to produce a relatively soft, non-grassed, playing surface for equestrian and sports events.

Nevertheless, no one has previously punched textile fibers directly into soil. Consequently, improving the appearance and playing characteristics of turfed surfaces in this manner appears not to have been investigated heretofore.

DISCLOSURE OF THE INVENTION

It is therefore an object of the present invention to provide a method for improving the appearance and performance characteristics of turf surfaces.

It is further object of the present invention to provide a method as above for improving the traction, the resistance to punching shear and the resistance to compaction in and of turfed surfaces.

It is another object of the present invention to improve the appearance of non-grassed areas within a normally turfed surface by punching grass colored textile fibers into the soil, leaving a portion of the fibers exposed above the surface to simulate grass blades.

It is yet another object of the present invention to provide a method which anchors newly sown grass roots that have been placed to remediate worn or barren areas of turfed surfaces.

At least one or more of the foregoing objects, together with the advantages thereof over known methods of treatment, which shall become apparent from the specification which follows, are accomplished by the invention as hereinafter described and claimed.

In general, the method of the present invention for the improvement of appearance and performance characteristics of turf surfaces includes the steps of applying from about 0.1 to about 0.5 percent by weight of discrete fiber materials selected from the group consisting of man-made fiber forming substances to turf growing and turf containing areas and then working the discrete fiber materials into the areas.

A related method of the present invention for the improvement of appearance and performance characteristics of turf surfaces includes the steps of applying from about 0.1 to about 0.5 percent by weight of discrete fiber materials selected from the group consisting of man-made fiber forming substances with seeds for the propagation of turf in barren areas and then working the discrete fiber materials into the areas.

BRIEF DESCRIPTION OF THE DRAWINGS

FIG. 1A is a schematic representation of an area providing turf;

FIG. 1B is a schematic representation of the area of FIG. 1A, depicting the turf after being worn away;

FIG. 1C is a schematic representation of the area of FIG. 1A, depicting the application of fibers to the area;

FIG. 1D is a schematic representation of the area of FIG. 1A, depicting the fibers worked into the area;

FIG. 1E is a schematic representation of the area of FIG. 1A, depicting the growth of new turf in the area;

FIG. 2A is a schematic representation of a barren area;

FIG. 2B is a schematic representation of a barren area, as in FIG. 2A, depicting the application of fibers to the area; and FIG. 2C is a schematic representation of a barren area as in FIG. 2A, depicting the growth of new turf in the area.

PREFERRED EMBODIMENT FOR CARRYING OUT THE INVENTION

As noted hereinabove, practice of the present invention is based upon the addition of various discrete fiber materials into areas that contain turf, e.g., grass, or in which turf can be grown, such as barren land. As is known, turf grasses are grown in soil, the basic types of mineral soils being gravel, sand, silt and clay. Mixtures thereof give rise to coarse-grained soils, more than 50 percent retained on a No. 200 sieve, and fine-grained soil, 50 percent or more passes through a No. 200 sieve. No attempt shall be made to discuss the variations in soil types. Those skilled in the art are familiar with and can refer to the *United Soil Classification System* published as ASTM Standard D2487. With reference thereto, soils with which the invention can be practiced include gravel, sand, silt and clay. The term "area" employed herein is intended to refer to all types of soil media in which turf is grown, and likewise can be improved or, in which turf can or will be grown.

The conventional fiber and slit film fiber materials that are added to the soil areas can be selected from the broad class of commercially available man-made fiber forming substances. Generally speaking, the materials should neither affect the soil nor be affected by the soil and therefore, the material should not mold, rot, mildew, dissolve or otherwise deteriorate in the soil environment but should maintain its basic integrity throughout its useful life.

As used in the specification, the term "discrete" is intended to mean a fibrous material that is individually distinct or one which is not mathematically continuous. These materials are further intended to be substantially non-continuous or capable of being made non-continuous. As used in the specification, the term "man-made fiber forming substances" is intended to embrace both cellulosic and non-cellulosic or synthetic base materials.

Preferred materials include the olefins, particularly polypropylene, polyesters, nylons, acrylics, and the like but should not be limited to these. Practical considerations include creep resistance, a strong trait of polyesters, and dispersibility of the fiber material in the soil, although the absence of either one of these properties should not eliminate a particular polymer. Typically, man-made fibers having specific gravities ranging from about 0.80 to 2.36.

The reinforcing materials can be divided into two categories, fibers and slit film fibers. Slit film fibers are described in greater detail below; however, it is notable that for practice of the present invention they are fiber-like, that is, their length to width or cross-sectional dimensions are comparable to fibers. Hence, the term discrete fiber materials has been employed herein to connote both fibers and slit film fibers. These two differ primarily by configuration although both are similarly dimensioned and are employed in approximately the same amounts. Mixtures of both fibers and slit film fibers can also be employed.

With respect first to the conventional fibers, configuration can be important, but is not a controlling feature. Yet, other cross-sectional configurations such as rectangular, square, round, oval, hollow and the like may further enhance soil cohesion or other properties. Additionally, embossed, multi-lobal, collated or bonded fibers, triangular, entangled multi-filaments or monofilaments and fibrids and fibrils are other practical types for soil reinforcement provided they can be uniformly dispersed into the soil. The fiber configuration could also be slubbed, spiraled, gear crimped, saw-tooth configured, gnarled, cork-screwed or otherwise deformed to develop cohesion or other fiber/soil matrix properties.

Fiber length can range from about 0.25 to 2.5 inches (0.635 to 6.35) with 0.25 to 1.0 inches (0.635 to 2.54 cm) being preferred. Fiber diameter is between about 0.07 to 0.1525 mm and is variable depending upon the application. Individual fiber deniers (dpf) can range between from about 30 to 150. The amount of fiber added to the soil ranges from at least about 0.1 percent by weight up to about 0.5 percent by weight with 0.3 percent being preferred. Practically speaking, the upper limit is not dictated by operability but more a matter of diminishing returns. Thus, for many fibers, once more than about 0.3 percent have been added, higher performance values may be offset by economics unless specific physical properties are sought. Nevertheless, amounts in excess of 0.5 percent are not beyond the scope of this invention if such additions can be justified.

If fibers are bundled by such means as fibrillation, twisting, bonding and the like, preferred bundle sized may be from 250 total denier (0.20 mm dia. equivalent) to about 2600 total denier (0.64 mm dia. equivalent)

In the case of fibrids, length and cross-section dimensions are variable and nonuniform. Fibrid and fibril lengths or bundle lengths of from about 0.04 to about 0.47 inches (1 to 12 mm) are preferred, with individual fiber diameters being subject to the manufacturing process. Generally, fibrids and fibrils will range from microdeniers to about 80 denier.

With respect to the slit film fiber materials, these are formed from films and sheets of the foregoing man-made fiber forming substances that have been slit into thin strips. These thin strips may be further split or treated by conventional processes into fibrillated or roll embossed film constructions. The films and sheets can be cut with conventional apparatus into narrow strips having both pairs of opposed sides parallel, e.g., rectangles and parallelograms, two sides parallel, e.g., trapezoids or no sides parallel, e.g., quadrangles and other polygonal strips.

Thickness of these strips may range from 0.001 to 0.020 inches (0.025 to 0.047 mm) and widths may vary as is necessary to achieve the final weight of the product desired. Lengths of the strips are comparable to that for the fiber materials disclosed hereinabove, namely from about 0.25 to about 2.5 inches (0.635 to 6.35 cm).

Similarly, the amount of such strips added to the soil or turf ranges from at least about 0.1 percent by weight up to about 0.5 percent by weight, just as for the fibers, with 0.3 percent being preferred. The strips can also be deformed in various manners to develop greater cohesion and/or other properties with the soil.

In addition to the amounts of the fibers or slit film fiber materials or mixtures thereof that are to be added to the soil or turf, another factor is depth of the composite soil/fiber and/or film fiber mixture. For the propagation of grassy materials, the composite should range from the surface to about 3.0 inches (0.0 to 7.62 cm) thick.

Unlike the use of fibers taught by my two earlier patents, U.S. Pat. Nos. 4,790,691 and 4,867,614, the present invention is the first time that fibers have been utilized for reinforcement i.e., anchoring, of root matrices. Additionally, this is the first instance where a portion of the fibers are deliberately exposed above the root line and the soil surface; hence dual functionality results, reinforcement below the surface and cosmetics above the surface. Accordingly, for turf embodiments, the fibers are preferably colored green although other colors are not precluded; nor, are unpigmented, neutral fibers.

Once the fibers are manufactured off-site, they must be applied to the prepared soil athletic surface or lawnscape by means such as, but not limited to the following:
(1) Hydroseeding, which generally applies seed, mulch materials and water to a soil surface for the encouragement of new grass growth. Textile fibers can be introduced in this manner, with the above constituents, or separately with water only.
(2) Hand broadcasting of the fibers to the distressed areas.
(3) Metering by means of seed, fertilizer or other top-dress soil spreading techniques.
(4) Off site pre-mixing into soils to be placed onto the distressed areas
(5) Pre-mixing into partially grown grass sod, wherein the green fibers provide color and strength to the immature sod that is placed onto the distressed areas.

Central to this invention is the working into, or combining the fibers with the soil surface or turf or both for "greening" the barren areas and improving the footing of the playing surface. This can be accomplished by means such as, but not limited to the following:
(1) Punching fibers, which have been placed onto the barren or distressed soil areas, into the surface by means of aeration equipment.
(2) "Watering-in" is viable in some soils, where the surface is turned to gumbo and the fibers are then rolled into the soil.
(3) Top dress without "cutting-in" the fibers.
(4) Slicing-in fibers by means of disc harrow or specialized turf slicing equipment.

Generally, it is to be understood that the step of working includes both total incorporation of the fibers into the soil, for reinforcement of roots, as well as partial incorporation. In the latter instance, roots and growing turf are reinforced while the exposed portion of the colored fibers contributes to the appearance characteristics of the area. Thus, partial incorporation occurs where some of the fiber materials are totally incorporated beneath the surface and some of the fiber materials are totally on the surface. It also occurs where some of the fibers are individually partially incorporated and partially exposed.

Furthermore, working also includes the top dressing of turf with the fibers where they become intertwined and enmeshed with the turf, anchoring and reinforcing it at the surface while also contributing to appearance. Moreover, during periods of heavy use and activity, the action of running or walking over the surface with and without cleated shoes, for instance, also contributes to working in of the fibers. The same may occur where the turfed surfaces are driven over during use.

If grass seed has been placed with the fibers, it should come to term before the area is disturbed by mowing. Should the fibers be used by themselves, fiber length should be a consideration so as not to interfere with post-addition field or lawnscape mowing.

If fiber "dusting" is not a problem, isolated small spots on a playing field and the like may be cosmetically remediated using 0.25 inch (0.635 cm) grass colored fibers. To do so, the fibers can be merely hand broadcast over the barren spot surface or fibers can be mixed with some soil medium such as sand and placed onto or in the distressed area.

Subsequent to seeding as well as during and after turf germination and growth, the present invention also provides for top dressing with additional applications of fibers to the surface. These fibers, in turn, can be left to remain on the surface or they can also be further worked into the soil and/or turf by suitable means such as those described hereinabove, or related methods.

With reference to the drawings, practice of the present invention is depicted schematically. FIGS. 1A–1E can be employed to illustrate and describe application of the method to existing turf. FIG. 1A presents soil 10, having an exposed surface 11, turf e.g., grass 12 above the surface and roots 13 below the surface. In FIG. 1B the turf 12 has been worn away, such as by heavy activity on the surface 11. Next, fibers 14 are applied to the soil via apparatus, indicated schematically by the numeral 15, and worked in by means (not shown, but discussed herein) as depicted in FIG. 1C. Some of the fibers become subsequently worked into the soil below the surface and around the roots 13 while some may be allowed to remain on the surface 11, as depicted in FIG. 1D. It is to be understood that alternatively, the apparatus 15 can apply a composite or mixture of fibers 14 and soil or a soil component, such as sand, or a mixture of sand and peat, or the like also as discussed herein. Grass seed, (not shown) may also be present. During the step of working, the surface 11 can also be levelled or otherwise shaped as desired.

In FIG. 1E, the new turf 12 has again appeared, reinforced at and above the surface by fibers 14 as well as the root zone 13. Although the repair of turf has been associated with the description of FIGS. 1A–1E, it is to be understood, that the method is applicable to existing turf, partially or totally worn at the surface, as well as barren areas interspersed between the turf.

For the treatment or repair of totally barren areas, the method of the present invention is also applicable. In FIG. 2A, soil 10 is again depicted, presenting a barren surface 21 with no turf or roots. To this surface, a composite of fibers 14 and seed 22 is applied, which may optionally include soil or a soil component, as discussed hereinabove and not shown. In FIG. 2B, the fibers 14 and seed 22 have been worked into the soil 10, a portion of which may remain above the surface 11. Finally, FIG. 2C represents growth of new turf 12 reinforced at the surface by fibers 14 and having fibers 14 serving to anchor and reinforce the roots 13 below the surface.

Again it should be understood that the steps of fiber application (FIG. 1C) can be repeated after the steps depicted in FIGS. 1E and 2C which further reinforces the turf as well as contributes to the general appearance of the surface. Likewise, these applications can subsequently be worked into the soil and turf as discussed hereinabove.

In order to demonstrate the effectiveness of the present invention, five individual plots, 10 ft. by 10 ft. by 5 ft. by 1 ft. deep (3.1 m×3.1 m×1.5 m×0.3 m), were constructed at the University of Missouri at Columbia turf research center in Columbia, Mo. Each root zone mix was comprised of 100 percent sand. Treatments containing fibers were added to only the upper four inches (10 cm) of each plot. The fiber and sand combinations were mixed off site in a large concrete truck mixer. The following mixtures were situated side-by-side in non-replicated plots:

Plot 1: 1 inch (2.54 cm) fibrillated, 0.5 percent by weight, 4 inch (10 cm) depth of fiber and sand mix.
Plot 2: 1 inch (2.54 cm) monofilament, 0.5 percent by weight, 4 inch (10 cm) depth of fibers and sand mix.
Plot 3: 1 inch (2.54 cm) fibrillated, 0.3 percent by weight, 4 inch (10 cm) depth of fiber and sand mix.
Plot 4: 1 inch (2.54 cm) monofilament, 0.3 percent by weight, 4 inch (10 cm) depth of fiber and sand mix.
Plot 5: Control-No fibers The parameters measured included hardness, soil moisture, and traction according to the following procedures.

Hardness

A cylindrical hammer with a mass of 0.5 kg and a diameter of 50 mm was dropped down a guide tube from a height of 300 mm (Clegg, 1976). An accelerometer attached to the hammer measured peak deceleration in gravities (g) caused by impact with the surface. Two methods of dropping the hammer were compared. A single drop in one location was compared to three consecutive drops in the same location. The latter represented the hardness after loading the surface. Each hammer weight and drop technique was repeated five times in each plot.

Traction

Traction was measured by two methods:
1. Torque wrench method

Six 15 mm long and 12.5 mm diameter football studs were spaced at 60 foot (18.5 m) intervals at a radius of 46 mm on a 150 mm diameter steel disc. The disc (weighted with a mass of 45 kg) was dropped from 50 mm high so that the studs penetrated the surface. The torque required for the studs to tear the surface layer was measured in Nm using a torque wrench (Canaway and Bell, 1986). A total of 48 measurements were made during each sampling date (3 torques per plot).

2. Torvane device

A CL-600A Torvane device from SOILTEST Lake Bluff, Illinois, was used to measure shear strength of the surface. The large vane with a ratio of 0.2 was used for measurements. This device is typically used for measuring surface failure in fully saturated cohesive soils. The root zone mix of the test plots was sand, peat, and fibers with soil moisture ranging between 3.7 and 8.5 percent. These values were considered wet for sand, but not saturated. The Torvane was inserted to the full depth of the vane and torque was applied by hand, with no downward pressure, until failure occurred. Five measurements were taken for each of the five treatments.

SOIL MOISTURE

Percent soil moisture was determined in the upper 10 cm of rootzone mix on a dry weight basis.

Results and Discussion

As a final step in construction, the plots were thoroughly soaked with water and rolled with a portable vibratory roller weighing approximately 150 lbs (68 kg). The roller was operated uniformly over the test area ten times. Traction, hardness and moisture data were collected. Fifteen days later, 0.85 inches (22 cm) of rain occurred and measurements were taken 10 hours later, the results of which have been reported in Table I hereinbelow.

TABLE I
HARDNESS, TRACTION AND SOIL MOISTURE RESULTS ON NON-GRASS PLOTS

|  | Hardness 0.5 kg | | Soil | Traction | |
| --- | --- | --- | --- | --- | --- |
|  | 1 drop | 3 drops | Moisture | Torque | Torvane |
| Treatment mean square | 690.14 | 20195.62 | 7.40 | 26.98 | 0.41 |
|  | Gmax | | Percent | ft. lb. | kg/cm$^2$ |
| Plot 5 (control) | 144.20 | 429.60 | 3.71 | 13.66 | 0.17 |
| Plot 3 (Fib 0.3 percent) | 115.60 | 292.20 | 8.46 | 19.33 | 0.31 |
| Plot 1 (Fib 0.5 percent) | 129.60 | 272.20 | 6.87 | 21.50 | 0.30 |
| Plot 4 (Mon 0.3 percent) | 125.80 | 365.80 | 8.27 | 17.67 | 0.25 |
| Plot 2 (Mon 0.2 percent) | 141.60 | 313.00 | 7.47 | 20.00 | 0.23 |

With respect to hardness, Gmax increased for all treatment when the number of hammer drops increased from one to three. Canaway (1990) proposed standards for hardness (20 to 80 g preferred and 10 to 100 g acceptable) based on a survey of players and Clegg impact measurements with a 0.5 kg hammer. All treatments, including the sand only control, measured with the 0.5 kg hammer exceeded the limits proposed by Canaway. This indicates that under moist and compacted conditions without grass cover, sand only or sand stabilized with synthetic fibers could exceed the proposed desirable level of hardness proposed by Canaway. The fibers did not increase the hardness of the rootzone mix compared to the sand only control.

With respect to soil moisture, there was no significant difference among treatments containing fiber; however, all treatments containing fiber had a higher percent soil moisture than the control plots containing only sand.

With respect to traction, via torque measurement, all fibers significantly increased traction (29 to 57 percent) compared to the sand only plots. Increasing the fiber rate from 0.3 percent to 0.5 percent also significantly increased traction for both fiber types. Proposed standard (Canaway, 1990) are 25 Nm preferred and 20 Nm acceptable. Only the fiber amended plots exceeded the proposed levels of traction, but they also exceeded the proposed hardness levels with the 0.5 kg hammer. The sand only rootzone exceeded the proposed hardness level and was deficient in the proposed traction value.

Traction via Torvane measurements indicated that all fibers increased surface stability compared to the sand only control. There were no effects from fiber rate but there was a significant increase in stability with the fibrillated fibers compared to the monofilament fibers.

In a separate evaluation, a college football field in Arizona was treated following a game played on a rain-soaked surface. It was observed that the field had been freshly sodded previously and hence, no deep roots had developed. Three days after the game, all of the loose sod was punched down using an aerator device. On that day and the next, a slurry of seed and green fibers was hydraulically applied over the damaged areas. The mixture was then rolled and subsequently treated with the aerator to punch in the seed and fibers.

Within seven days, the germinated seed was developing nicely. Two days later the grass was cut and the next game was played on the tenth day after repair was initiated. Throughout the season, the field appeared green and uniform. Traction was good on the remediated center field. Treatment during the period comprised the working in of colored fibers weekly directly over the grass.

Subsequent treatments were essentially the same regarding hydraulic placement of seed and fiber until the weather and lower temperatures no longer permitted seed germination. At this time top dressing and punching in the fibers replaced grass in the barren areas. As a result, fibers were punched into the root zone continually while some remained on the surface as well, thus fulfilling the dual objectives of root reinforcement and cosmetic surface treatment.

Based upon the foregoing disclosure, it should now be apparent that the present invention carries out the objects set forth hereinabove. It should be apparent to those skilled in the art that the addition of fibers and/or slit film fiber materials to a variety of athletic soil and lawnscape is possible just as a wide variety of fibers and slit film fiber materials are available from which to choose. Although the invention has been exemplified by the addition of fibrillated and monofilament polypropylene fibers to sand, it is to be understood that such examples were provided to enable those skilled in the art to have representative examples by which to evaluate the invention and thus, these examples should not be construed as any limitation on the scope of the invention. Similarly, the length of reinforcing material, its configuration and the amount added to a given soil surface can all be determined from the disclosure provided herein.

In addition the method of the present invention is applicable to existing, growing turf, to partially and totally worn turf, with and without roots and, to barren soil in which turf is to be propagated. In every instance, the turf appearance is reinforced and cosmetically improved at the surface while the roots are anchored and reinforced below the surface. Moreover, a useful playing surface or other purpose turf area is provided in a much shorter time than if turf were grown and/or restored without the aid of discrete fiber materials according to the present invention.

Thus, it is believed that any of the variables disclosed herein can readily be determined and controlled without departing from the spirit of the invention herein disclosed and described. Moreover, the scope of the invention shall include all modifications and variations that fall within the scope of the attached claims.

What is claimed is:

1. A method for the improvement of appearance and performance characteristics of turf surfaces comprising the steps of:
   applying discrete fiber materials selected from the group consisting of man-made fiber forming substances to turf growing and turf containing areas, in an amount of from about 0.1 to about 0.5 percent by weight of said discrete fiber materials based upon the weight of said turf growing and turf containing material; and
   working said discrete fiber materials into said areas by driving said fibers into said areas to the extent that a first portion of said fiber materials is carried beneath the surface of said area, reinforcing and anchoring the turf at the root zone level and a second portion is at least partially exposed above the surface of said area, remaining visible with the turf.

2. A method, as set forth in claim 1, wherein said step of applying includes the step of applying soil with said discrete fiber materials.

3. A method, as set forth in claim 1, wherein said step of applying includes the step of applying seeds with said discrete fiber materials.

4. A method, as set forth in claim 1, wherein said step of working includes driving said fibers completely below the surface of said area.

5. A method, as set forth in claim 4, wherein said fibers are driven completely below the surface of said area prior to the appearance of turf at the surface.

6. A method, as set forth in claim 4, wherein said fibers are driven completely below the surface of said area during times when turf is present at the surface.

7. A method, as set forth in claim 1, wherein said step of working includes intermixing of said fibers at the surface with said turf, thereby intertwining and enmeshing said fibers therewith.

8. A method, as set forth in claim 7, including the additional step of driving at least a portion of said intertwined and enmeshed fibers beneath the surface.

9. A method for the improvement of appearance and performance characteristics of turf surfaces comprising the steps of:
   applying discrete fiber materials selected from the group consisting of man-made fiber forming substances to turf growing and turf containing areas, in an amount of from about 0.1 to about 0.5 percent by weight of said discrete fiber materials based upon the weight of said turf growing and turf containing material; and
   working said discrete fiber materials into said areas;
   repeating said step of applying over and around growing turf; and
   working said fiber materials by driving said fibers into the turf to the extent that a first portion of said fiber materials is carried beneath the turf reinforcing and anchoring the turf at the root zone level and a second portion is at least partially exposed above the turf, remaining visible with the turf.

10. A method, as set forth in claim 9, wherein said second step of working includes driving said fibers completely below the turf.

11. A method for the improvement of appearance and performance characteristics of turf surfaces comprising the steps of:
   applying discrete fiber materials selected from the group consisting of man-made fiber forming substances with seeds for the propagation of turf in barren areas, in an amount of from about 0.1 to about 0.5 percent by weight of discrete fiber materials based upon the weight of said barren areas; and
   working said discrete fiber materials into said areas by driving said fibers into said areas to the extent that a first portion of said fiber materials is carried beneath the surface of said area, reinforcing and anchoring the turf at the root zone level and a second portion is at least partially exposed above the surface of said area, remaining visible with the turf.

12. A method, as set forth in claim 11, wherein said step of applying includes the step of applying soil with said discrete fiber materials and seeds.

13. A method, as set forth in claim 11, wherein said step of working includes driving said fibers completely below the surface of said barren area.

14. A method, as set forth in claim 11, wherein said step of working includes driving said fibers partially below the surface of said barren area.

15. A method, as set forth in claim 11, including the additional step of repeating said step of applying.

16. A method, as set forth in claim 15, including the additional step of working said fiber materials.

17. A method, as set forth in claim 11, including the additional step of repeating said step of applying over and around growing turf, subsequent to its appearance from said previously barren area.

18. A method, as set forth in claim 17, including the additional step of working said fiber materials.

* * * * *